Figure 1:
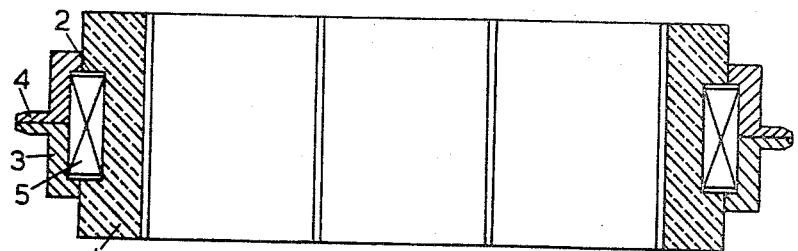

United States Patent Office

3,311,204
Patented Mar. 28, 1967

3,311,204
TORQUE-TRANSMITTING MEANS PERMITTING RELATIVE RADIAL EXPANSION AND CONTRACTION BETWEEN A PAIR OF COAXIAL DRIVEN AND DRIVING MEMBERS
Mark C. S. Barnard, Solihull, England, assignor to The Rover Company Limited, Solihull, England
Filed Nov. 12, 1964, Ser. No. 410,449
Claims priority, application Great Britain, Nov. 27, 1963, 46,804/63
1 Claim. (Cl. 192—41)

The invention relates to a torque-transmitting means capable of permitting relative radial expansion and contraction between a pair of rotatable, coaxial driven and driving members and is particularly concerned with means for rotating the rotor of a rotary regenerative heat exchanger.

Where the rotor of a rotary regenerative heat exchanger is made of a material having a small coefficient of expansion, e.g. a ceramic, and the rotor is to be driven by an annular member, coaxial with the rotor and made of metal or other material having a considerably greater coefficient of expansion, the designer is faced with the problem of how to allow for relative radial expansion or contraction between the rotor and the driving member and also to maintain the driving torque therebetween. An object of the invention is to provide a torque-transmitting means capable of maintaining driving torque and also of accommodating the said relative expansion and contraction.

According to the invention, a pair of coaxial driving and driven members are arranged with an annular gap between adjacent circumferential surfaces thereof and the torque-transmitting means comprises an annulus, or at least one part-annular portion, of resilient strip material positioned in said gap and formed throughout its length with transverse corrugations, of which the radially-inner and outer crests engage respectively the radially-inner and outer circumferential surfaces, each corrugation being so inclined to the truly radial direction that the radially-inner crest thereof precedes the next adjacent radially-outer crest in the intended direction of rotation of the members.

With this arrangement, as the radial width of the annular space between two circumferential surfaces increases due to expansion of the radially-outer member relative to the radially-inner member, the corrugations will tend to become more radial, as a result of the resilience of the strip material, and conversely, when the radial width of the annular space decreases, the corrugations will tend to become less radial. In this way the corrugations will be maintained in contact with the respective circumferential surface, whereby torque will be transmitted from the driving to the driven member. Another result of the resilience of the strip material is that when resistance of the driven member increases, e.g. on starting, the corrugations tend to become more radial thereby enabling a greater torque to be transmitted by virtue of the increased wedging effect of the corrugations on the members and conversely when the resistance of the driven member decreases, the corrugations tend to become less radial thereby reducing said wedging effect and hence enabling a smaller torque to be transmitted. Thus the corrugations enable the annulus to be self-compensating according to the resistance of the driven member.

As aforesaid, the invention is particularly applicable to the driving of the rotor of a rotary regenerative heat exchanger.

Accordingly, the invention also provides means for rotating a rotor of a rotary regenerative heat exchanger, said rotating means including an annular driving member arranged coaxially around the rotor, there being an annular gap between adjacent circumferential surfaces of the rotor and the driving member, and torque-transmitting means positioned within said annular gap, the torque-transmitting means comprising an annulus, or at least one part-annular portion, of resilient strip material formed throughout its length with transverse corrugations, of which the radially-inner and outer crests engage the outer circumferential surface of the rotor and the inner circumferential surface of the driving member, each corrugation being so inclined to the truly radial direction that the radially-inner crest thereof precedes the next adjacent radially-outer crest in the intended direction of rotation of the rotor.

The invention also includes a rotary regenerative heat exchanger having a rotor and means for rotating said rotor, said rotating means being as set out in the immediately preceding paragraph.

Figure 2:
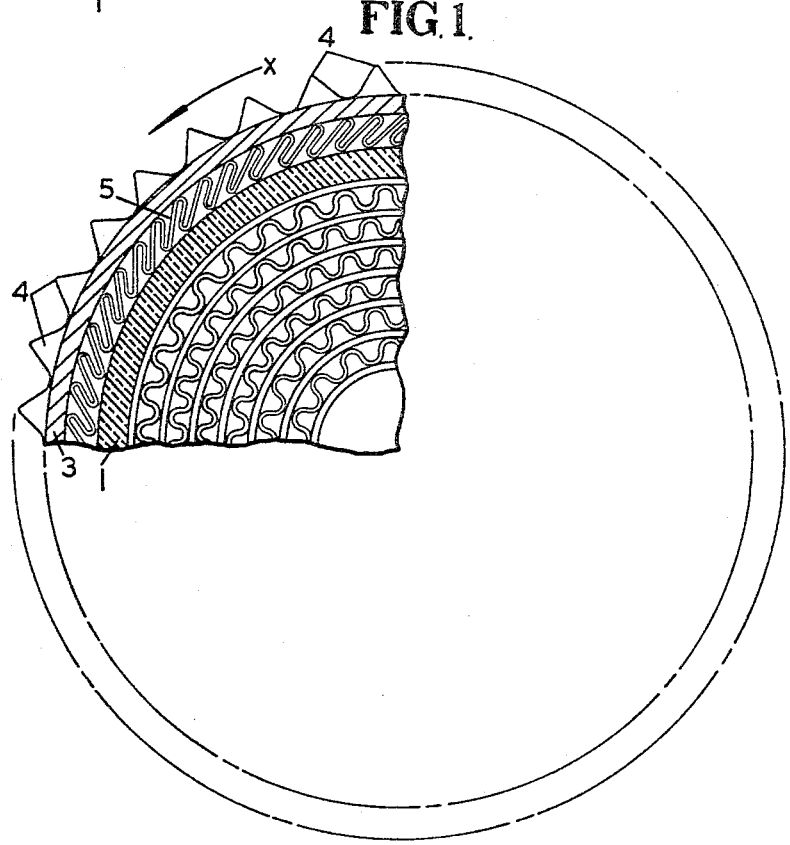
Figure 3:
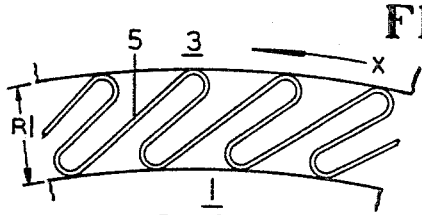
Figure 4:
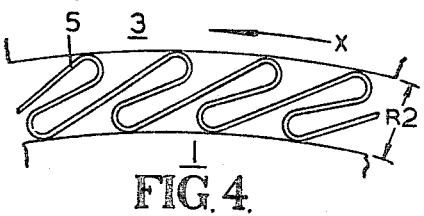

By way of example, means in accordance with the invention for rotating a rotor of a rotary regenerative heat exchanger will now be described with reference to the accompanying drawings, in which:

FIGURE 1 is an axial section through the rotor and the rotating means, the latter comprising an annular driving sprocket coaxial with the rotor and torque-transmitting means positioned in an annular gap between the driving sprocket and the rotor, FIGURE 2 is a fragmentary section on the line II—II in FIGURE 1, and FIGURES 3 and 4 are diagrams similar to a portion of FIGURE 2 drawn to a larger scale and showing how the torque-transmitting means accommodates relative radial expansion and contraction between the driving sprocket and the rotor.

In FIGURES 1 and 2 the rotor 1 is shown somewhat diagrammatically and is a cylindrical matrix made of a ceramic material having an extremely small coefficient of expansion. An annular groove 2 is provided in the outer peripheral surface of the rotor and this is surrounded by the annular sprocket 3 consisting of two rings assembled back-to-back and having teeth 4 extending radially from their outer peripheries. The teeth 4 of the sprocket 3 are engaged by a chain (not shown) whereby the sprocket is rotated. The annular groove 2 in the rotor 1 contains the torque-transmitting means, this being a strip 5 of spring metal which is formed throughout its length with transverse corrugations and is bent to form a substantially complete annulus or it may be secured at adjacent ends to form a complete annulus. The crests at the radially-inner and outer peripheries of the corrugated annular strip 5 engage respectively the cylindrical face at the back of the groove 2 and the radially-inner cylindrical face of the sprocket 3. Each corrugation is so inclined to the truly radial direction that the radially-inner crest thereof precedes the next adjacent radially-outer crest in the intended direction of rotation of the rotor, indicated in FIGURES 2, 3 and 4 and by the arrow X. When the sprocket 3 is turned by the chain, the torque will be transmitted through the corrugations by their wedging effect between the sprocket and the rotor, and so the rotor will be turned. As aforesaid, the corrugations will tend to become more radial as the sprocket 3, which is of metal or other material having a greater coefficient of expansion than the material of the rotor, expands relatively to the rotor 1 and the radial width of the annular gap between them thereby becomes greater. Conversely the corrugations will tend to become less radial as the sprocket 3 cools and the radial width of the gap between them becomes smaller. This is demonstrated by a comparison of FIGURES 3 and 4 in which the radial width R1 of the gap in FIGURE 3 is greater than the radial width R2 of the gap in FIGURE 4. In FIGURES 3 and 4 the difference between the distances R1 and R2 has been shown exaggerated and hence the change in the inclination of the corrugations is also exaggerated. Also, when resistance of the rotor is greater, e.g. on starting, the corrugations would tend to become more radial thereby transmitting a greater torque by virtue of the increased wedging effect of the corrugations, so that the corrugations tend to have a self-compensating effect. Another advantage of employing the corrugated torque-transmitting strip 5 is that it acts as a one-way driving device similarly to a sprag type clutch, because if the sprocket is accidentally turned in the reverse direction i.e. opposite to the arrow X, the corrugations will tend to collapse towards the positions in which they are tangential to the back face of the groove 2 and so will slip and not transmit torque to the rotor. Another advantage of employing the corrugated strip 5 is that as it is resilient it acts to absorb a knock or other shock load applied through the sprocket 3 and hence helps to protect the rotor from damage. This is especially important where the rotor material is brittle.

Although in the foregoing example, the rotor is of a ceramic material and has an extremely small coefficient of expansion, the invention could be applied to the case where the rotor is of another material e.g. metal and has a greater coefficient of expansion than the structure with which it co-operates.

Instead of driving the rotor by the sprocket and chain as described hereinbefore, the driving member may be an annulus having external gear teeth for engagement with a driving gear.

Instead of the corrugated strip being of spring metal it may be made of another resilient material capable of being corrugated and acting in the same manner as the strip 5.

Instead of forming the annulus of one corrugated strip, a plurality of separate shorter part-annular, i.e. arcuate, portions of corrugated strip material, arranged end-to-end to form a substantially complete annulus, may be employed.

What I claim as my invention and desire to secure by Letters Patent of the United States is:

A rotary regenerative heat exchanger including a rotor and means for rotating said rotor, said means comprising an annular driving member of a material having a considerably higher coefficient of expansion than that of the material of the rotor and arranged substantially coaxially around the rotor, there being an annular groove in at least one of the adjacent circumferential surfaces of the rotor and the driving member, and torque-transmitting means positioned within said annular groove, wherein the improvement comprises the torque-transmitting means being an annulus formed from at least one portion of resilient strip material of substantially uniform thickness and of width, in the axial direction of the rotor, substantially equal to the axial width of the groove and formed throughout the length of the strip with transverse corrugations, of which the radially-inner and outer crests engage the outer circumferential surface of the rotor and the inner circumferential surface of the driving member, each corrugation being so inclined to the truly radial direction that the radially-inner crest thereof precedes the next adjacent radially-outer crest in the intended direction of rotation of the rotor.

References Cited by the Examiner
UNITED STATES PATENTS

| | | | |
|---|---|---|---|
| 2,689,633 | 9/1954 | Turner | 192—45.1 |
| 2,845,159 | 7/1958 | Stephenson | 192—45.1 |
| 2,953,901 | 9/1960 | Chute | 165—7 |
| 3,061,060 | 10/1962 | Stephenson | 192—41 |

DAVID J. WILLIAMOWSKY, *Primary Examiner.*

C. J. HUSAR, *Assistant Examiner.*